(12) United States Patent
Krishnamoorthy et al.

(10) Patent No.: US 9,695,832 B2
(45) Date of Patent: Jul. 4, 2017

(54) APPARATUSES FOR CONTROLLING OPERATION OF A MOTOR OF A FAN ASSEMBLY BASED ON AN INDUCED VOLTAGE OR A BACK ELECTROMOTIVE FORCE

(71) Applicant: Marvell World Trade LTD., St. Michael (BB)

(72) Inventors: Ravishanker Krishnamoorthy, Singapore (SG); Foo Leng Leong, Singapore (SG); Edy Susanto, Singapore (SG); Yayue Zhang, Singapore (SG); Cheng Yong Teoh, Singapore (SG)

(73) Assignee: Marvell World Trade Ltd., St. Michael (BB)

( * ) Notice: Subject to any disclaimer, the term of this patent is extended or adjusted under 35 U.S.C. 154(b) by 213 days.

(21) Appl. No.: 14/462,821

(22) Filed: Aug. 19, 2014

(65) Prior Publication Data

US 2014/0354200 A1  Dec. 4, 2014

Related U.S. Application Data

(63) Continuation of application No. 13/233,593, filed on Sep. 15, 2011, now Pat. No. 8,807,956, which is a
(Continued)

(51) Int. Cl.
*F04D 27/00* (2006.01)
*F04D 13/06* (2006.01)
(Continued)

(52) U.S. Cl.
CPC ....... *F04D 27/004* (2013.01); *F04D 13/0693* (2013.01); *F04D 15/0094* (2013.01);
(Continued)

(58) Field of Classification Search
CPC .. F04D 25/0693; F04D 25/068; F04D 27/008; F04D 13/0686; F04D 13/0693;
(Continued)

(56) References Cited

U.S. PATENT DOCUMENTS 4,684,866 A     8/1987   Nehmer et al.
4,928,043 A  *  5/1990   Plunkett ................. H02P 6/182
                                                       318/400.11

(Continued)

OTHER PUBLICATIONS

Brushless DC Electric Motor;Wikipedia, the free encylopedia; http://en.wikipedia.org/wiki/Brushless_DC_electric_motor; Apr. 29, 2009; 6 pages.
(Continued)

*Primary Examiner* — Bryan Lettman
*Assistant Examiner* — Timothy Solak

(57) ABSTRACT

An integrated circuit for controlling operation of a motor of a fan assembly. The fan assembly includes a housing and a fan. The motor is in the housing. The housing is void of sensors. The motor is configured to rotate the fan. The integrated circuit includes a detection module and a first control module. The detection module is separate from the fan assembly. The detection module is configured to detect a voltage induced in a first coil of the motor or a back electromotive force received from the first coil of the motor. The first control module is configured to receive a control signal from a second control module and control the operation of the fan based on (a) the control signal, and (b) the voltage induced in the first coil of the motor or the back electromotive force. The second control module is separate from the integrated circuit.

19 Claims, 10 Drawing Sheets

Related U.S. Application Data continuation-in-part of application No. 12/469,196, filed on May 20, 2009, now Pat. No. 8,277,198.

(60) Provisional application No. 61/385,928, filed on Sep. 23, 2010, provisional application No. 61/114,168, filed on Nov. 13, 2008.

(51) Int. Cl.

| | | |
|---|---|---|
| *F04D 15/00* | (2006.01) | |
| *F04D 25/06* | (2006.01) | |
| *H02K 29/12* | (2006.01) | |
| *H02K 29/14* | (2006.01) | |
| *H02P 6/08* | (2016.01) | |
| *H02P 6/182* | (2016.01) | |
| *H02P 29/032* | (2016.01) | |

(52) U.S. Cl.
CPC ....... *F04D 25/0693* (2013.01); *F04D 27/001* (2013.01); *H02K 29/12* (2013.01); *H02K 29/14* (2013.01); *H02P 6/08* (2013.01); *H02P 6/182* (2013.01); *H02P 29/032* (2016.02)

(58) Field of Classification Search
CPC .... F04D 15/0094; H02K 29/06; H02K 29/12; H02K 29/14
See application file for complete search history.

(56) References Cited

U.S. PATENT DOCUMENTS

| | | | | |
|---|---|---|---|---|
| 5,019,757 | A | * | 5/1991 | Beifus .................. F04D 27/004 318/400.07 |
| 5,128,825 | A | | 7/1992 | Hurley et al. |
| 5,467,025 | A | | 11/1995 | Ray |
| 5,859,520 | A | | 1/1999 | Bourgeois et al. |
| 6,318,965 | B1 | * | 11/2001 | Nair ...................... F04D 27/004 417/17 |
| 6,428,282 | B1 | | 8/2002 | Langley |
| 6,456,031 | B1 | | 9/2002 | Gallegos-Lopez et al. |
| 6,572,338 | B2 | | 6/2003 | Janisse et al. |
| 6,586,903 | B2 | | 7/2003 | Moriarty |
| 6,594,456 | B2 | | 7/2003 | Kimizuka et al. |
| 6,664,749 | B2 | | 12/2003 | Heydt et al. |
| 6,912,134 | B2 | | 6/2005 | Grant et al. |
| 6,949,900 | B1 | * | 9/2005 | Berringer ................. H02P 6/08 318/400.03 |
| 6,954,684 | B2 | | 10/2005 | Frankel et al. |
| 7,026,774 | B2 | | 4/2006 | Inaba et al. |
| 7,057,362 | B2 | | 6/2006 | Norman |
| 7,122,985 | B2 | | 10/2006 | Kikuchi |
| 7,187,551 | B2 | | 3/2007 | Fissore et al. |
| 7,313,770 | B2 | | 12/2007 | Zhang et al. |
| 7,514,888 | B2 | | 4/2009 | Bakker et al. |
| 7,876,522 | B1 | | 1/2011 | Calaway et al. |
| 8,143,825 | B2 | | 3/2012 | Leong et al. |
| 8,164,285 | B2 | | 4/2012 | Leong et al. |
| 8,269,440 | B2 | | 9/2012 | Leong et al. |
| 2005/0029976 | A1 | * | 2/2005 | Terry ...................... F04B 35/04 318/400.21 |
| 2005/0116675 | A1 | * | 6/2005 | Dooley .................. H02K 29/12 318/400.04 |
| 2005/0225272 | A1 | | 10/2005 | Wu et al. |
| 2006/0099082 | A1 | | 5/2006 | Simofi-lilyes et al. |
| 2006/0142901 | A1 | * | 6/2006 | Frankel ............. H05K 7/20209 700/300 |
| 2006/0197479 | A1 | | 9/2006 | Wang et al. |
| 2007/0152613 | A1 | * | 7/2007 | Mullin .................. F04D 27/004 318/432 |
| 2007/0282461 | A1 | * | 12/2007 | Harwood ................ H02P 6/182 700/14 |

OTHER PUBLICATIONS

U.S. Appl. No. 61/118,820, filed Dec. 1, 2008, Leong et al.

* cited by examiner

APPARATUSES FOR CONTROLLING OPERATION OF A MOTOR OF A FAN ASSEMBLY BASED ON AN INDUCED VOLTAGE OR A BACK ELECTROMOTIVE FORCE

CROSS-REFERENCE TO RELATED APPLICATIONS

The present disclosure is a continuation of U.S. patent application Ser. No. 13/233,593 (now U.S. Pat. No. 8,807, 956), filed on Sep. 15, 2011, which is a continuation in part of U.S. patent application Ser. No. 12/469,196 (now U.S. Pat. No. 8,277,198) filed on May 20, 2009. This application claims the benefit of U.S. Provisional Application No. 61/114,168 filed on Nov. 13, 2008 and U.S. Provisional Application No. 61/385,928 filed on Sep. 23, 2010. The entire disclosures of the applications referenced above are incorporated herein by reference.

FIELD

The present disclosure relates to thermal control systems, and more particularly to motor control systems of fans for cooling electronic circuits.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cooling fan assemblies may provide airflow to dissipate heat generated by electronic components. Cooling fan assemblies may include a motor that drives fan blades. Traditional cooling fan assemblies include a printed circuit board (PCB) mounted inside a housing of the motor. Fan control modules and Hall-effect sensors are mounted on the PCB and used to control a speed of the motor.

Referring now to FIG. 1, a cooling fan system 100 is shown and includes a PCB 101 that is mounted in a motor housing 102. A motor control module 104 is mounted on the PCB 101. Wires 105 connect the PCB 101 to a host device (not shown) via terminals 106 on the PCB 101. An example of a host device is a personal computer.

The motor housing 102 includes a motor 107. The motor 107 may include a two-phase brushless direct current (DC) motor. The motor 107 may include four stator poles: pole A1 108, pole A2 109, pole B1 110, and pole B2 112. Each of the stator poles A1 108, A2 109, B1 110, B2 112 may be wound with stator coils 114. The pole A1 108 and the pole A2 109 may collectively be called "pole pair A". The pole B1 110 and the pole B2 112 may collectively be called "pole pair B".

The motor control module 104 may apply a voltage and/or current to the stator coils 114 of the pole pair A to generate a magnetic field between the pole A1 108 and the pole A2 109. Applying the voltage and/or current to the stator coils 114 of the pole pair A may be called "driving phase A". The motor control module 104 may provide the voltage and/or current to the stator coils 114 of the pole pair B to generate a magnetic field between the pole B1 110 and the pole B2 112. Applying the voltage and/or current to the stator coils 114 of the pole pair B may be called "driving phase B".

The motor 107 also includes a rotor 116. The rotor 116 may include at least one permanent magnet. The motor control module 104 may drive phase A and/or phase B to actuate the rotor 116 about an axle 118. The axle 118 may mechanically couple the rotor 116 to the motor housing 102. The motor housing 102 includes externally attached fan blades 119. The fan blades 119 are collectively referred to as a fan 120. While the rotor 116 in FIG. 1 rotates between the stator poles A1 108, A2 109, B1 110, B2 112 the motor 107 may alternatively include a rotor that surrounds the stator poles A1 108, A2 109, B1 110, B2 112.

The motor control module 104 may alternate between driving phase A and driving phase B to actuate the rotor 116. At least one Hall-effect sensor 122 may be mounted on the PCB 101 and be used to determine a position and/or a speed of the rotor 116. For example, the Hall-effect sensor 122 may generate a pulse when a magnetic pole of the rotor 116 passes the Hall-effect sensor 122. The motor control module 104 may determine whether the rotor 116 is rotating and/or a speed of the rotor 116 based on the pulses generated by the Hall-effect sensor 122.

SUMMARY

An integrated circuit for controlling operation of a motor of a fan assembly is provided. The fan assembly includes a housing and a fan. The motor is in the housing. The housing is void of sensors. The motor is configured to rotate the fan. The integrated circuit includes a detection module and a first control module. The detection module is separate from the fan assembly. The detection module is configured to detect (i) a voltage induced in a first coil of the motor, or (ii) a back electromotive force received from the first coil of the motor. The first control module is configured to (i) receive a control signal from a second control module, and (ii) control the operation of the fan based on (a) the control signal, and (b) the voltage induced in the first coil of the motor or the back electromotive force. The second control module is separate from the integrated circuit.

In other features, an integrated circuit for controlling operation of a motor of a fan assembly is provided. The fan assembly includes a housing, one or more sensors, and a fan. The motor is in the housing. The motor is configured to rotate the fan. The integrated circuit includes a detection module and a first control module. The detection module is separate from the fan assembly. The detection module is configured to, independent of signals generated by the one or more sensors, detect (i) a voltage induced in a first coil of the motor, or (ii) a back electromotive force received from the first coil of the motor. The first control module is configured to (i) receive a control signal from a second control module, and (ii) control the operation of the fan based on (a) the control signal, and (b) the voltage induced in the first coil of the motor or the back electromotive force. The second control module is separate from the integrated circuit.

In other features, an integrated circuit for controlling operation of a motor of a fan assembly is provided. The fan assembly includes a housing and a fan. The motor is in the housing. The motor is configured to rotate the fan. The integrated circuit includes a detection module and a first control module. The detection module is separate from the fan assembly. The detection module is configured to, without receiving a signal from a sensor, detect (i) a voltage induced in a first coil of the motor, or (ii) a back electromotive force received from the first coil of the motor. The first control module is configured to (i) receive a control signal from a second control module, and (ii) control the operation of the fan based on (a) the control signal, and (b) the voltage induced in the first coil of the motor or the back electromotive force. The second control module is separate from the integrated circuit.

In other features, a fan system is provided and includes a motor control module external to a motor housing of a fan assembly. The motor control module includes a speed control module. The fan assembly includes a fan and the motor housing. One or more first conductors are configured to connect the motor control module to a motor in the motor housing. One or more second conductors are configured to connect the motor control module to a host device control module. The host device control module is separate from the motor control module and is configured to generate a control signal. The speed control module is configured to control speed of the fan based on the control signal.

In other features, the motor control module is connected between at least one of the first conductors and at least one of the second conductors. In other features, the fan system further includes a cable connected to the motor and to the host device control module. The cable includes the motor control module.

In other features, the motor control module is mounted on a support member of the motor housing. The support member includes an opening for passing air through the support member to contact the temperature sensor.

In other features, the temperature sensor is mounted on the fan assembly and in a path of air flowing through the fan assembly. In other features, the temperature sensor is separate from the motor control module and is mounted on the fan assembly.

In other features, the fan system further includes a connector connected between the one or more first conductors and the one or more second conductors and external to the fan assembly. The motor control module is mounted on or in the connector. In other features, the motor control module is physically accessible without physically accessing the motor housing.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
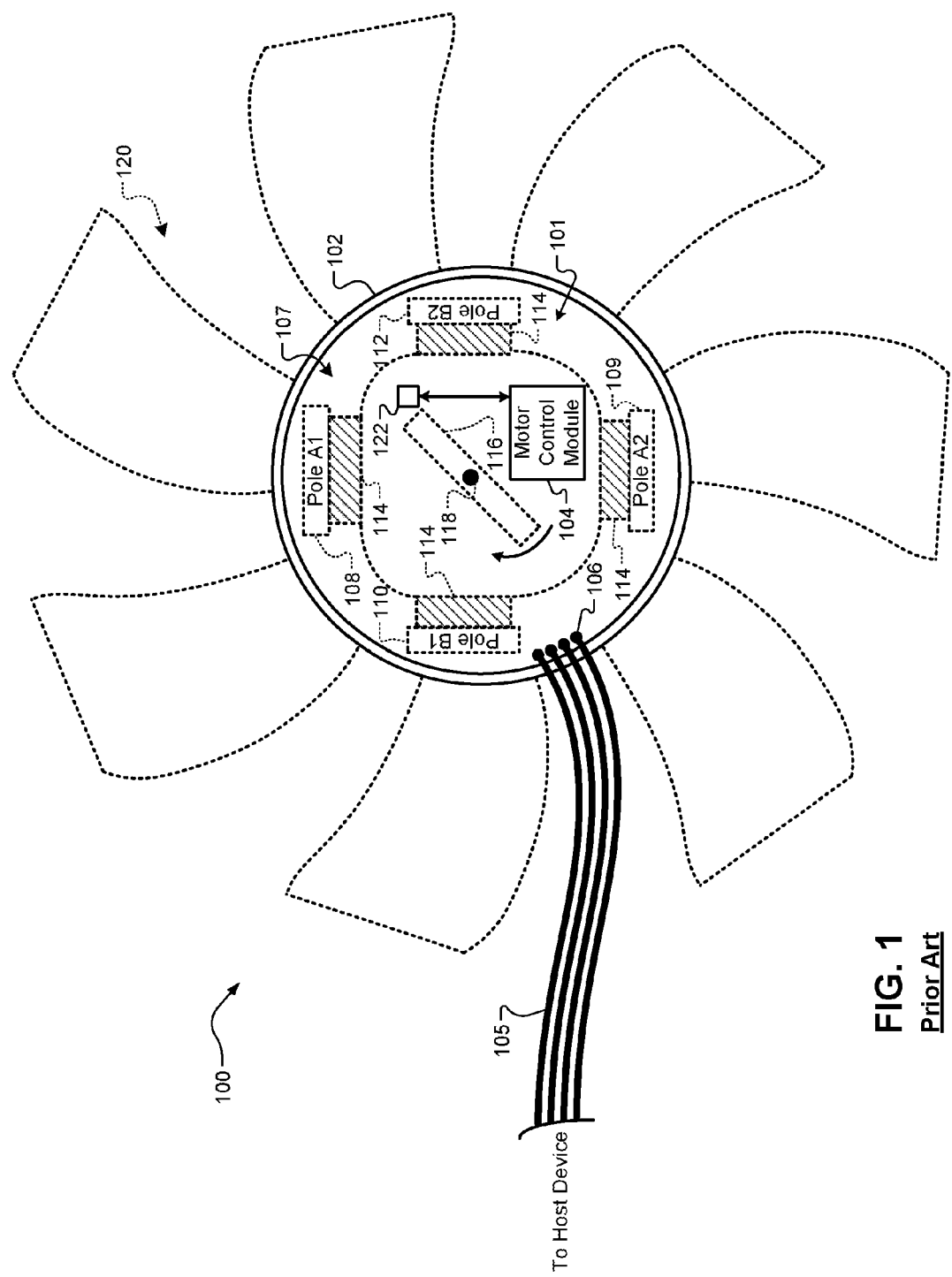
FIG. 1 is a fan system according to the prior art.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Traditional fan assemblies include a printed circuit board (PCB) mounted inside a motor housing. Fan electronics, such as fan control modules and Hall-effect sensors, were mounted on the PCB to control the motor. Thus, the motor housing was physically accessed and/or disassembled in order to alter fan electronics on the PCB. Further, size of the fan assembly was dependent on the size of the PCB, as the fan assembly needed to be large enough to enclose the PCB.

Implementations disclosed herein include motor control modules that are external to respective motor housings. The motor housings may include various types of fan motors. Some types of fan motors are brushed motors, brushless motors, direct current (DC) motors, alternating current (AC) motors, etc. The fan motors may have any number of phases. Some fan motors with different numbers of phases are a single-phase motor, a two-phase motor and a three phase motor.

The motor control modules disclosed herein may be physically accessed, altered and/or replaced without physically accessing and/or opening the motor housings. The motor control modules may not include a Hall-effect sensor. As a result, the motor control modules and corresponding printed circuit boards (PCBs) may be removed entirely from respective fan assemblies. In addition, sizes of the PCBs are minimized due to the number and size of the components incorporated on the PCBs.

Figure 2A:
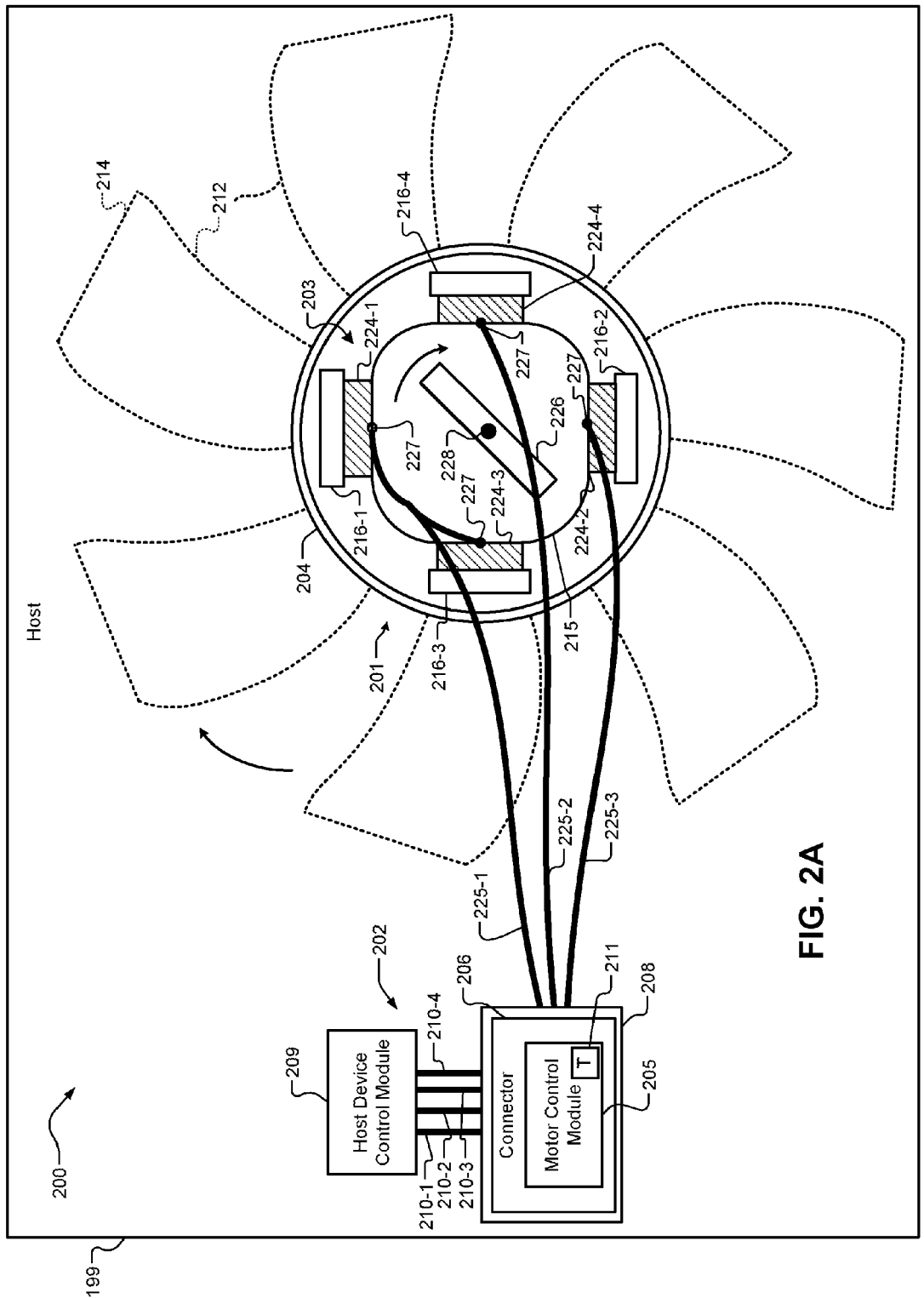
FIG. 2A is a fan system incorporating a connector with a motor control module in accordance with the present disclosure.

In FIG. 2A, a host 199 is shown. The host 199 includes a fan system 200 with a fan assembly 201 and a control circuit 202. The fan assembly 201 includes a motor 203 in a motor housing 204. The motor 203 may be a motor of one of the types described above or may be, for example, a two-phase brushless DC motor, as shown. The control circuit 202 includes a motor control module 205 that is external to and/or remote from the motor housing 204 and controls the motor 203.

Figure 5:
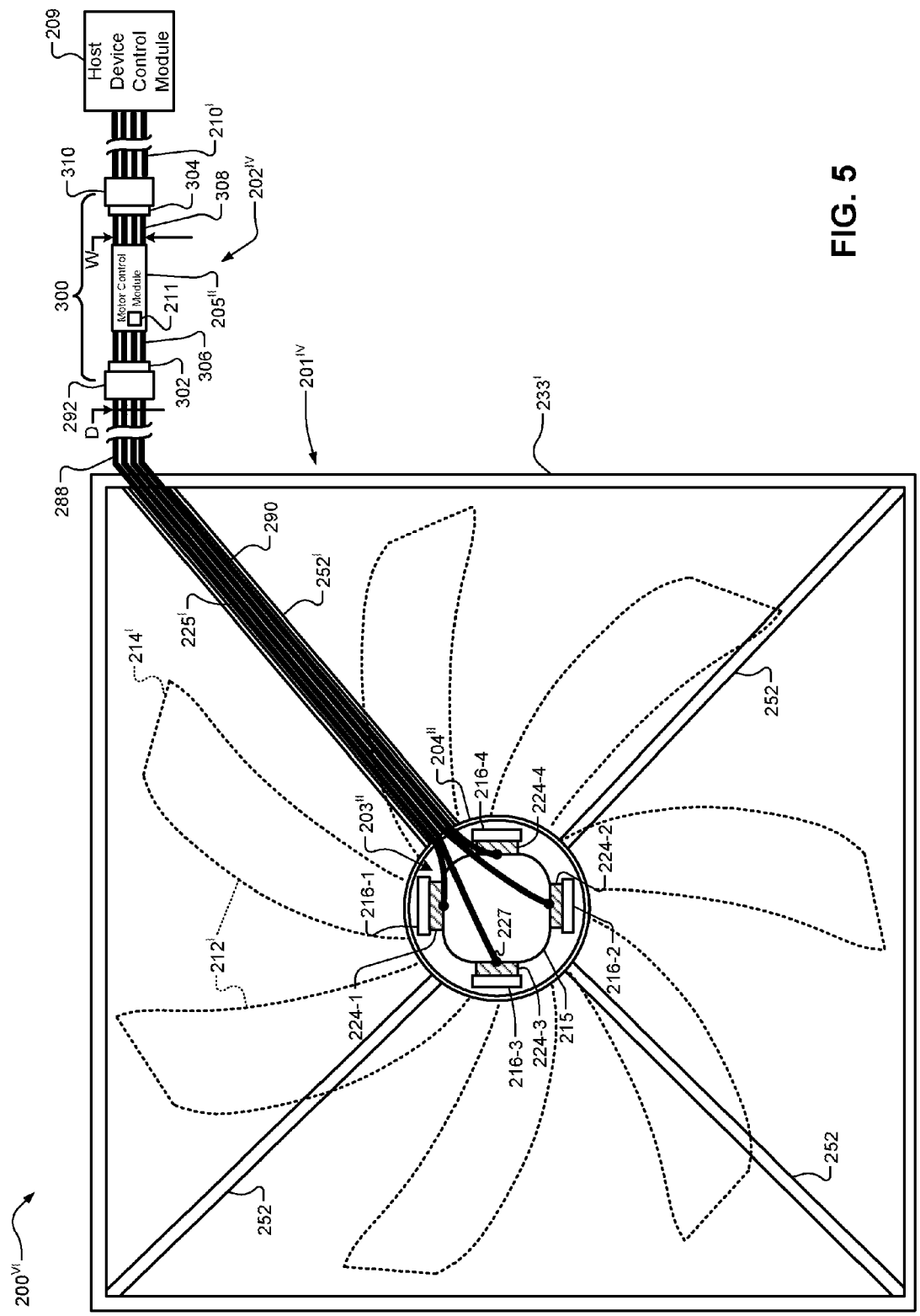
FIG. 5 is another fan system incorporating a motor control module in a cable and in accordance with the present disclosure.
Figure 6:
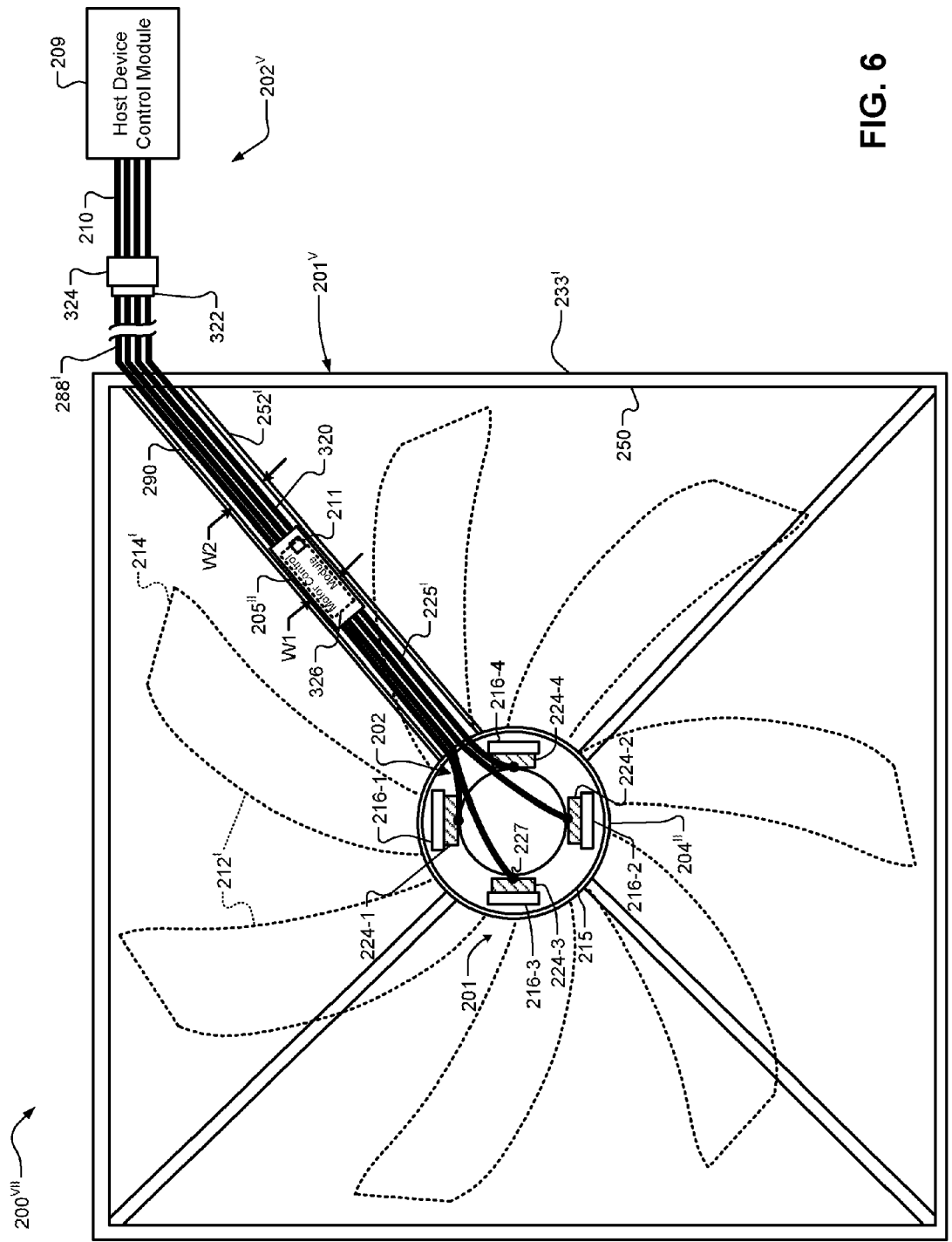
FIG. 6 is another fan system incorporating a motor control module in a support member of a fan assembly and in accordance with the present disclosure.

The motor control module 205 is mounted on or within a connector 206 and/or a connector housing 208. The connector 206 is used to connect the motor 203 to a host device control module 209. At least a portion of the connector 206 may be encased within the connector housing 208. At least a portion of the motor control module 205 may be encased within the connector 206 and/or the connector housing 208. The connector housing 208 may be a two-part connector with mating components, such as a plug and a receptacle (or socket). Two-part connectors are shown in FIGS. 5 and 6. The motor control module may be connected to, mounted on and/or located in one or more of the mating components of the connector 206.

The connector 206 may interface with a host device control module 209 of the host 199 via conductors 210. The term "conductors" as used herein may refer to insulated or non-insulated wires, conductive traces, conductive lines, etc. The host device control module 209 may be, for example, a control module of an electrical and/or electronic system. For example the host may be a personal computer, a server, a projector, a refrigerator, a printer, an electronic instrument, etc. The host device control module 209 may be a central processing unit (CPU). The fan assembly 201 may be mounted on and/or be proximate to the host device control module 209 to provide direct cooling to the host device control module 209.

The motor control module 205 may include a PCB, an IC, resistors, capacitors, and/or other electronic components and terminals. The PCB may be a single-sided or dual-sided PCB. A single-sided PCB has electronic components only on one side of the PCB. A dual-sided PCB has electronic components on two sides of the PCB. Incorporating components on two sides of a PCB allows for the two-sided PCB to be sized smaller than a single-sided PCB. However, a two-sided PCB is more difficult to manufacture and has higher associated costs than a single-sided PCB.

In the implementation shown the motor control module 205 includes a temperature sensor (e.g., a thermistor) 211. The temperature sensor 211 may be used to detect temperatures of the host 199 (e.g., temperatures within the host 199), temperatures of air passing through the fan assembly 201, and/or temperatures of the motor 203. The temperature sensor 211 and/or the connector 206 may be mounted in a path of the air flowing through the fan assembly 201. The temperature sensor 211 may be mounted on the motor control module 205, on or in the connector 206, on or in the connector housing 208, or elsewhere. Other examples of mounting locations for the temperature sensor 211 are shown in FIGS. 2E, 5 and 6. To further simplify and reduce the size of the motor control module 205, the motor control module 205 may not include the temperature sensor 211, as further described with respect to FIG. 2E.

The fan assembly 201 includes the motor housing 204. Fan blades 212 are attached to or integrally formed as part of the motor housing 204. The fan blades 212 and the motor housing 204 may be collectively referred to as a fan 214. The fan 214 may direct air to cool electronic components of the host 199, such as the motor control module 205 and/or the host device control module 209. The motor housing 204 includes the motor 203, which includes a stator 215 and a rotor 226.

The stator 215 includes four stator poles: pole A1 216-1, pole A2 216-2, pole B1 216-3, and pole B2 216-4 (collectively stator poles 216). Each of the stator poles 216 may be wound with stator coils 224-1, 224-2, 224-3, 224-4 (collectively stator coils 224), respectively. The motor control module 205 may communicate with the stator poles 216 via conductors 225 that communicate with terminals 227 on the stator poles 216.

The rotor 226 may include at least one permanent magnet (not shown) and rotates relative to the stator 215 based on control signal(s) generated by the motor control module 205 and/or by the host device control module 209. The rotor 226 may be mounted on an axle (or rotor shaft 228) that connects the rotor 226 to the motor housing 204. In operation, rotation of the rotor 226 rotates the rotor shaft 228 and the motor housing 204 relative to the stator 215.

Figure 2E:
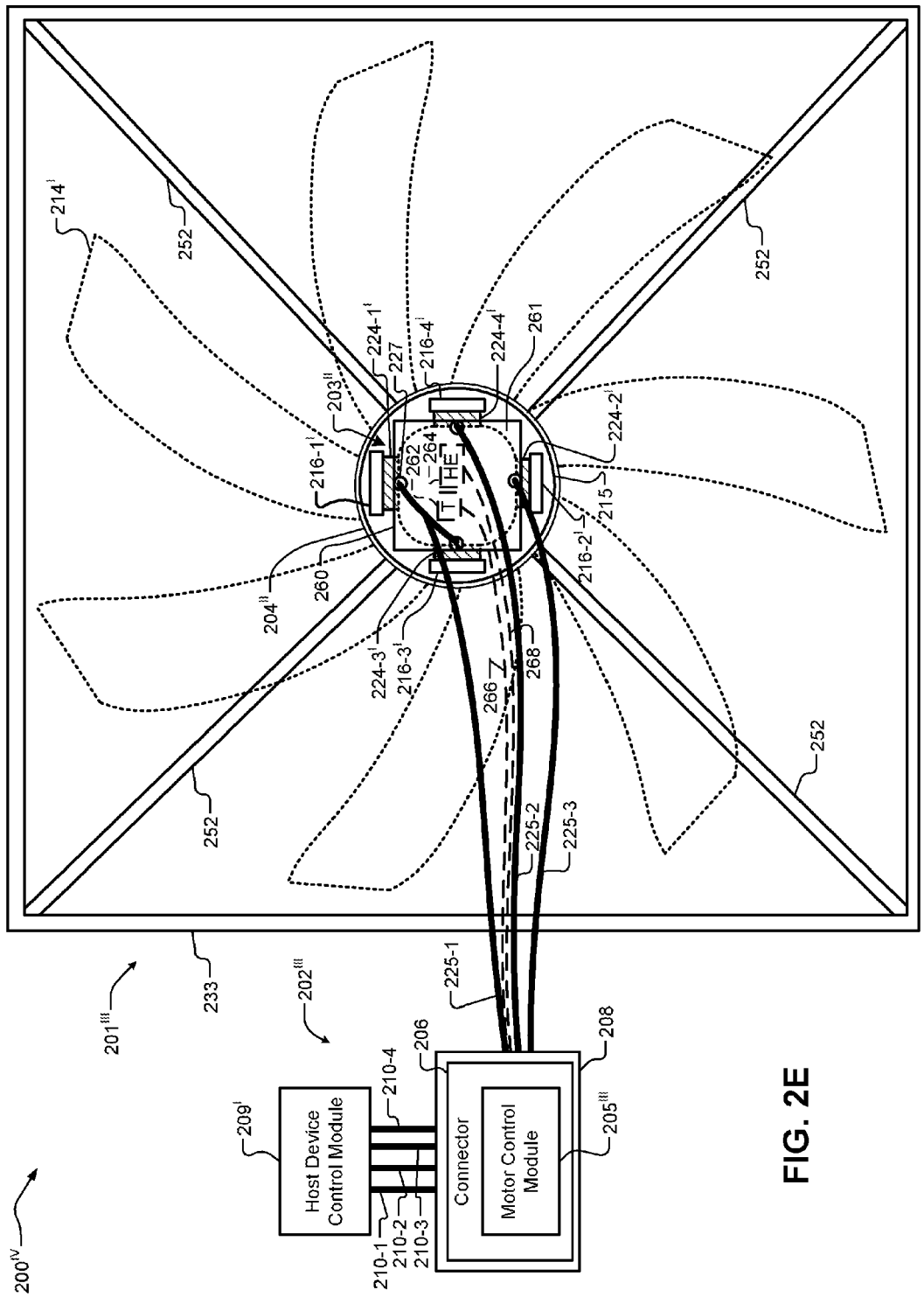
FIG. 2E is yet another fan system incorporating a motor stability module in accordance with the present disclosure.
Figure 3:
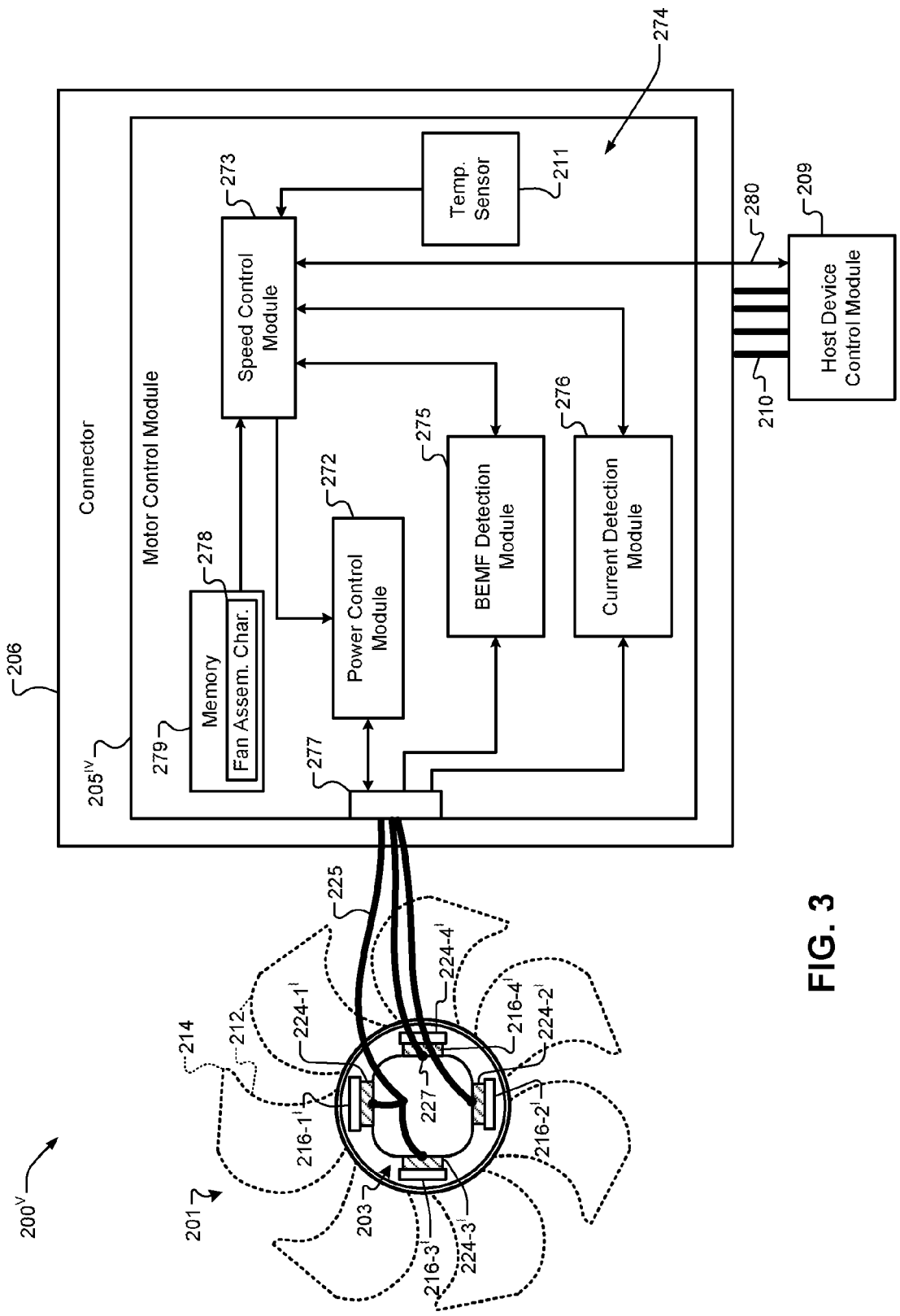
FIG. 3 is a fan system illustrating a more detailed view of a motor control module in accordance with the present disclosure.

The conductors 210 may include, for example, a ground (or voltage reference) wire 210-1, a voltage source wire 210-2, a speed control wire 210-3 and a feedback wire 210-4 (referred to as a "TACHO" wire). The speed control wire 210-3 may receive a pulse width modulation (PWM) signal from the host device control module 209, which indicates a commanded reference speed. The feedback wire 210-4 provides a feedback signal generated by the motor control module 205 to the host device control module 209. The feedback signal indicates a current speed of the motor 203. The feedback signal may be generated based on a signal from a Hall effect sensor and/or a speed signal from a speed control module. An example of a Hall effect sensor is shown in FIG. 2E. An example of a speed control module is shown in FIG. 3.

Although three conductors are shown in FIG. 2A between the connector 206 and the motor 203, the fan system 200 may incorporate two or more conductors between the connector 206 and the motor 203. In the implementation of FIG. 2A, the motor 203 is a two-phase motor, where the conductors 225 include a ground (or reference) wire 225-1, a first phase wire 225-2 and a second phase wire 225-3. Two of the terminals 227 may be shorted together and connected to the ground wire 225-1. The other two terminals are connected to a respective one of the first phase wire 225-2 and the second phase wire 225-3. Alternative implementations include numerous different wire and terminal arrangements, such as a four wire arrangement, where each of the conductors is connected to a respective one of the terminals 227. The four wire arrangement is used on a three-phase motor, as shown in FIGS. 5 and 6.

The conductors 210 and 225 and other conductors disclosed herein which are connected to a motor control module may be extended through PCBs of the motor control modules and soldered to the PCBs. As an alternative, the conductors may be surface mounted and/or soldered. Surface mounting the conductors may aid in reducing size of the motor control modules. Wire restraints (not shown) may be used to protect wire connections on the motor control module depending upon how the conductors are connected to the motor control modules and/or the application of use.

Figure 2B:
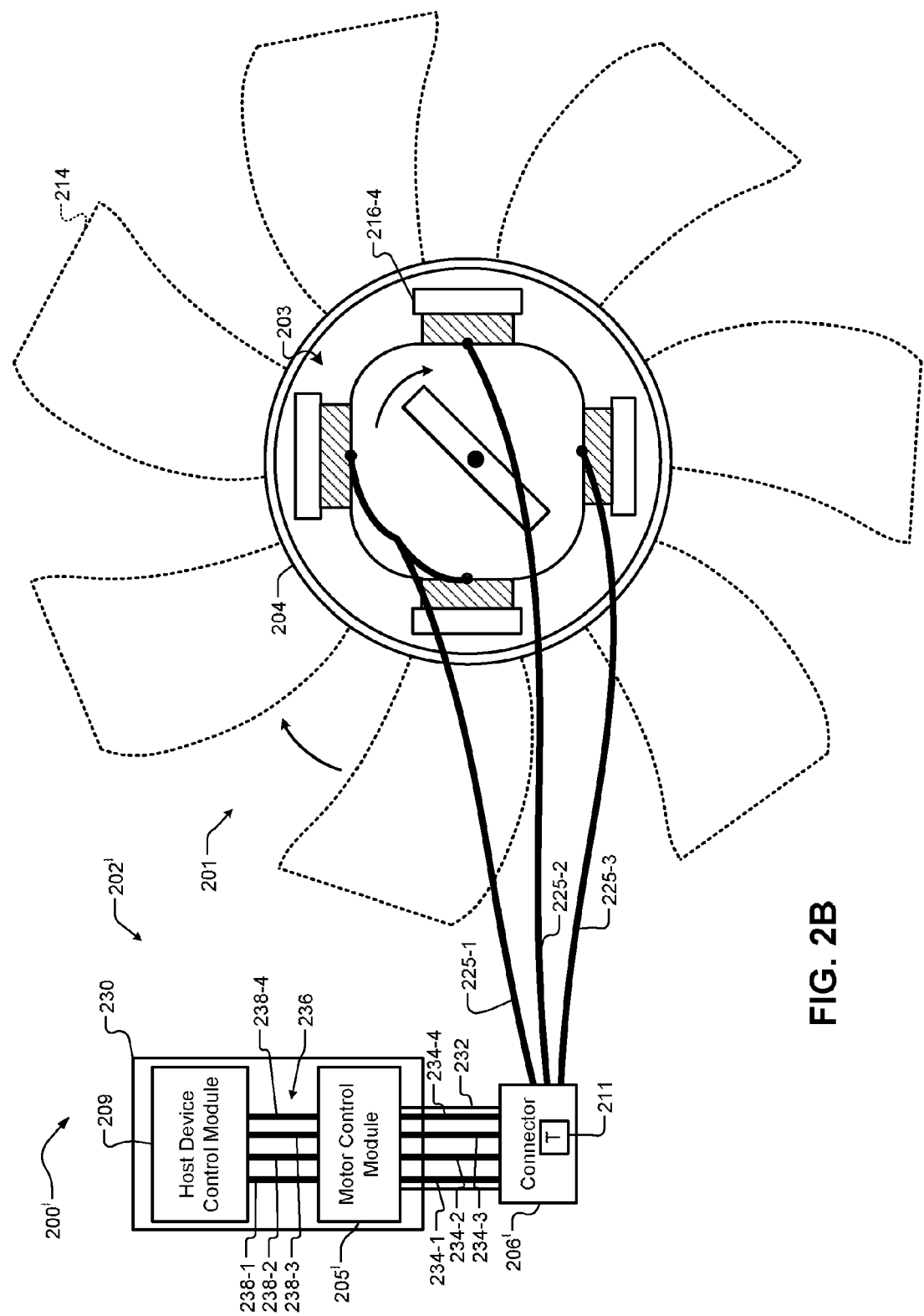
FIG. 2B is another fan system incorporating a motor control module located at a host and in accordance with the present disclosure.

In FIG. 2B, a fan system $200^I$ is shown. The fan system $200^I$ includes the fan assembly 201 and a control circuit $202^I$. The fan assembly 201 includes the motor housing 204 with the motor 203 and the fan 214. The control circuit $202^I$ includes a thermal control module 230. The thermal control module 230 is connected to the fan assembly 201 via a connector $206^I$. The thermal control module 230 is external to and remotely located from the fan assembly 201. The thermal control module 230 includes the host device control module 209 and the motor control module $205^I$. In this implementation, the motor control module $205^I$ is externally and remotely located from the fan assembly 201 and the connector $206^I$. As an example, the connector $206^I$ may be mounted on a PCB of a host (e.g., the host 199 of FIG. 1) and the fan assembly 201 may be mounted on a housing or case of the host.

The thermal control module 230 may include a PCB and/or one or more system-in-packages (SIPs), and/or system-on-a-chips (SOCs). The thermal control module 230 may be a SIP or a SOC. The host device control module 209 and the motor control module $205^I$ may each be an SOC or be incorporated in a single SIP or a single SOC. In one implementation, the thermal control module 230 includes a PCB and the control modules are SOCs mounted on the PCB. The PCB may be a motherboard when the host is, for example, a personal computer.

The connector $206^I$ may include a temperature sensor (or thermistor) 211. A temperature signal may be transmitted from the connector $206^I$ to the motor control module $205^I$ for regulating speed of the fan 214. The temperature sensor 211 may alternatively be located on the fan assembly 201.

A first interface 232 may connect the connector $206^I$ to the motor control module $205^I$ and/or thermal control module 230. The first interface 232 may include a cable and/or conductors. In one implementation, four conductors 234 are connected between the motor control module $205^I$ and the connector $206^I$. The four conductors 234 may include a ground (or reference wire) 234-1, a temperature signal wire 234-2, and two or more power conductors 234-3, 234-4 for respective phases of the motor 203.

A second interface 236 may be connected between the motor control module $205^I$ and the host device control module 209. The interface 236 may include a cable and/or conductors. In one implementation, four or more conductive traces 238 are connected between the motor control module $205^I$ and the host device control module 209. The conductive traces 238 may include a ground (or reference) trace 238-1, a power trace 238-2, a speed control (e.g., PWM) trace 238-3, and a feedback (e.g., TACHO) trace 238-4. The speed control and feedback traces 238-3, 238-4 may be used to transfer PWM and TACHO signals similar to the speed control and feedback conductors 210-3, 310-4 of FIG. 2A.

Figure 2C:
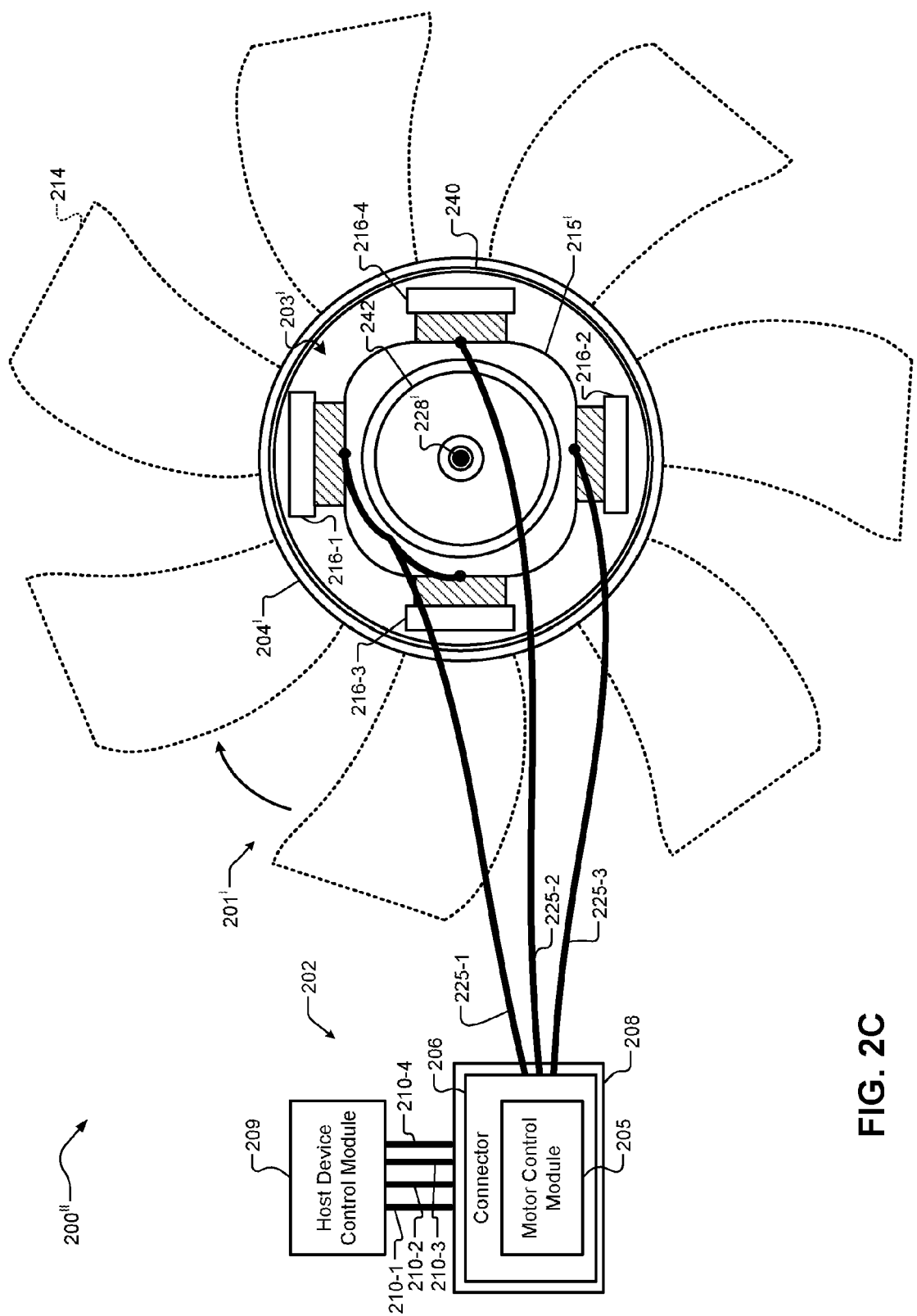
FIG. 2C is still another fan system incorporating a rotor that surrounds a stator in accordance with the present disclosure.

In FIG. 2C, a fan system $200^{II}$ is shown. The fan system $200^{II}$ includes a fan assembly $201^I$ and the control circuit 202. The fan assembly $201^I$ includes a motor housing $204^I$ with a motor $203^I$. The motor $203^I$ includes a stator $215^I$ and a rotor 240. The stator $215^I$ includes the stator poles 216. The rotor 240 surrounds the stator poles 216. The rotor 240 rotates around the stator poles 216 in response to voltage/current supplied to the stator poles 216.

The rotor 240 may include a rotor shaft $228^I$ that is disposed in a bearing 242. The bearing 242 may be a sleeve bearing or ball bearing ring. The rotor 240 rotates relative to the stator $215^I$ via the bearing 242.

The control circuit 202 includes the motor control module 205 and the host device control module 209. The motor control module 205 is located in the connector 206, which may in turn be located in the connector housing 208. The connector 206 and/or motor control module 205 are connected to the host device control module 209 via the conductors 210. The motor control module 205 and/or the connector 206 are connected to the motor $203^I$ via the conductors 225.

Figure 2D:
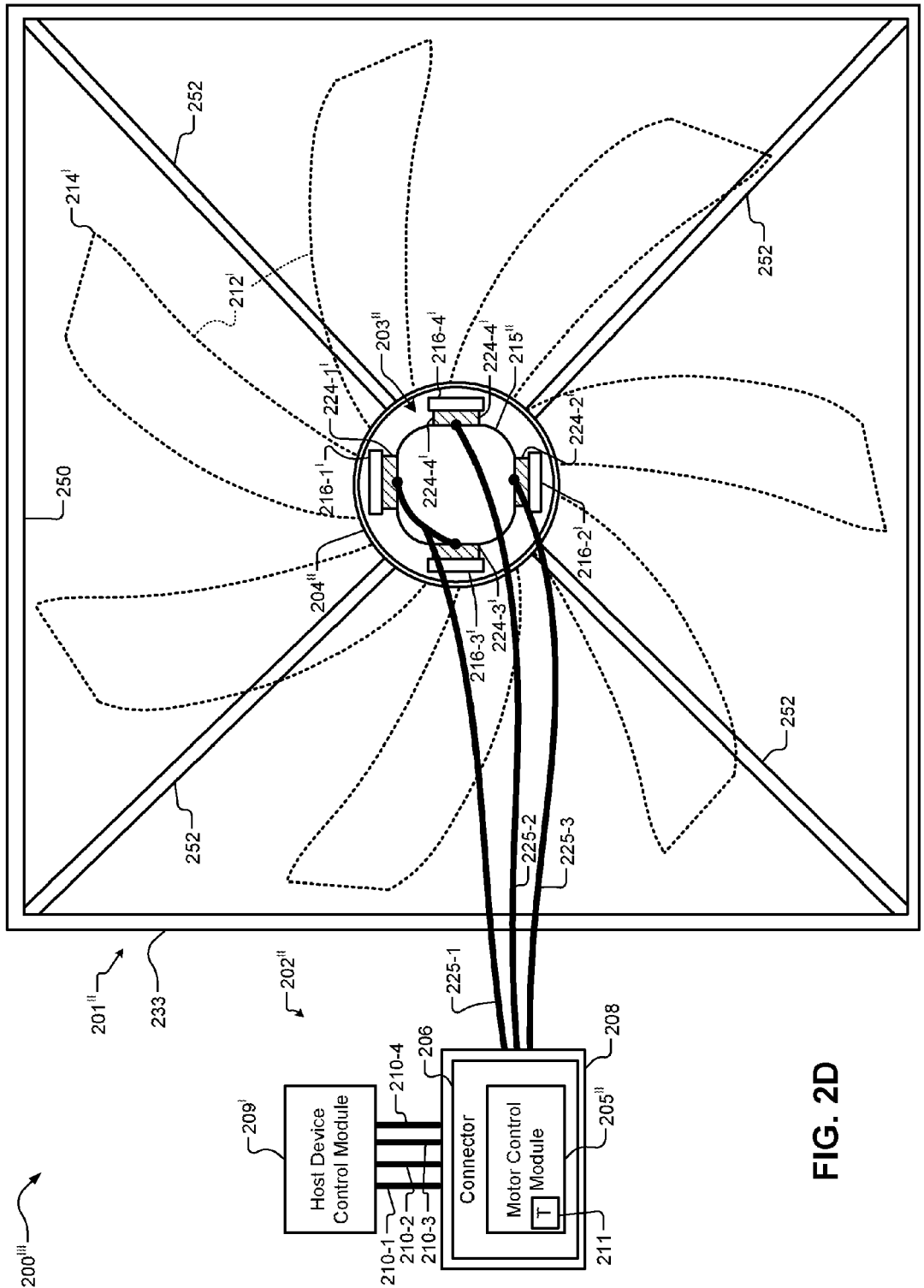
FIG. 2D is another fan system illustrating a fan case and relative sizes of fan assembly components in accordance with the present disclosure.

Referring now to FIG. 2D, a fan system $200^{II}$ is shown. The fan system $200^{II}$ includes a fan assembly $201^{II}$ and the control circuit $202^{II}$. The fan assembly $201^{II}$ includes a fan case 233. The fan case 233 includes a peripheral wall 250 and a motor housing $204^{II}$. The motor housing $204^{II}$ is supported in a center of the peripheral wall 250 by support members 252. The fan case 233 may be sized for an application of use. Some examples of height and width dimensions of fan cases are 60 mm×60 mm, 80 mm×80 mm, 92 mm×92 mm and 120 mm×120 mm, although the fan case 233 may have different dimensions depending on the application of use.

A motor $203^{II}$ is located in the motor housing $204^{II}$. The motor $203^{II}$ may be similar to the motor 203 and/or $203^I$ of FIGS. 2A-2C. The motor $203^{II}$ may include the stator $215^{II}$ with stator poles $216^I$ (or $216^I$-1, $216^I$-2, $216^I$-3, $216^I$-4) and stator coils $224^I$ (or $224^I$-1, $224^I$-2, $224^I$-3, $224^I$-4). The motor $203^{II}$ may include a rotor similar to the rotors 226 and 240 of FIGS. 2A-2C and rotate in or around the stator $215^{II}$. Fan blades $212^I$ are attached or integrally formed as part of the motor housing $204^{II}$ and together are collectively referred to as a fan $214^I$.

The control circuit $202^{II}$ includes a motor control module $205^{II}$, the connector 206 with the housing 208, and a host device control module $209^I$. The motor control module $205^{II}$ may be mounted on or in the connector 206 and is configured to control speed of the fan $214^I$. The motor control module $205^{II}$ may include the temperature sensor 211 and adjust speed of the fan $214^I$ based on a temperature signal from the temperature sensor 211. The temperature sensor 211 may be mounted on the motor control module $205^{II}$, on or in the connector 206 and/or on or in the connector housing 208. The host device control module $209^I$ is connected to the motor control module $205^{II}$ via the conductors 210. The motor control module $205^{II}$ is connected to the motor $203^{II}$ via the conductors 225. The conductors 225 may be routed in a channel of one of the support members 252, as shown in FIGS. 5 and 6.

In the implementation of FIG. 2D, the motor control module $205^{II}$ is not located in the motor housing $204^{II}$. Also, a Hall effect sensor is not incorporated in the fan assembly $201^{II}$ and/or in the motor housing $204^{II}$. This allows for a smaller motor housing $204^{II}$ to be used due to a reduction in the number of components incorporated in the motor housing $204^{II}$. A smaller sized motor housing, allows for larger fan blades to be used. If a size of the fan case 233 for the fan assembly $201^{II}$ is unchanged, the smaller the motor housing $204^{II}$, the more space between the fan case 233 and the motor housing $204^{II}$ for the fan blades $212^{I}$.

Although the control modules $205^{II}$ and $209^{I}$ may be similar to the control modules 205, $205^{I}$ and 209 of FIGS. 2A-2D, the control modules $205^{II}$ and $209^{I}$ are configured to accommodate the motor $203^{II}$ and the fan blades $212^{I}$. The motor $203^{II}$ may provide a higher output torque than the motors 203 and $203^{I}$ of FIGS. 2A-2C. The motor $203^{II}$ may provide a higher output torque to accommodate for the size of the fan blades $212^{I}$, which may be larger than the fan blades 212 of FIGS. 2A-2C. The increased size of the fan blades $212^{I}$ provides an increased amount of air flow for improved cooling efficiency. For this reason, a motor with a higher output torque may be used.

Traditionally, the ability to reduce the size of a motor housing was limited due to the incorporation of a PCB including a Hall effect sensor in the motor housing. Since a PCB and/or a Hall effect sensor may not be incorporated in the motor housings disclosed herein, the size of the corresponding fan assemblies may be the same or smaller than the size of a traditional fan assembly. The fan assemblies disclosed herein may have motors, motor housings and/or fan blades that are smaller in size than traditional motors, motor housings and/or fan blades.

Referring now to FIG. 2E, a fan system $200^{IV}$ is shown. The fan system $200^{IV}$ includes a fan assembly $201^{II}$ and a control circuit $202^{II}$. The fan assembly $201^{II}$ includes the fan $214^{I}$ with the motor housing $204^{II}$. The motor housing $204^{II}$ encases the motor $203^{II}$. The motor $203^{II}$ includes the stator poles $216^{I}$ and the stator coils $224^{I}$. The control circuit $202^{II}$ includes a motor control module $205^{II}$ and the host device control module $209^{I}$. The motor control module $205^{II}$ may be located in the connector 206 and/or connector housing 208. The host device control module $209^{I}$ is connected to the motor control module $205^{III}$ via the conductors 210. The motor control module $205^{III}$ is connected to the motor $203^{II}$ via the conductors 225.

A stability module 260 may be mounted in or on the motor housing $204^{II}$ to provide mechanical stability for electrical connections in the motor housing $204^{II}$. The conductors 225 may be connected to the stability module 260, which communicates with terminals 227 rather than, as in FIGS. 2A-2D, directly soldered or otherwise directly connected to the terminals 227.

The stability module 260 may include a PCB 261. The stability module may not include any sensors or may, for example include a temperature sensor 262 and/or a Hall effect sensor 264. The Hall effect sensor 264 may be used to detect and/or determine position, movement, and/or speed of the fan $214^{I}$. Alternatively, position, movement, and/or speed of the fan $214^{I}$ may be determined by a speed control module of the motor control module $205^{III}$. The temperature sensor 262 and the Hall effect sensor 264 may have respective conductors 266, 268 that are connected to the motor control module. Although the stability module 260 as shown includes a temperature sensor 262 and/or a Hall effect sensor 264, the stability module 260 may not include the temperature sensor and/or the Hall effect sensor. The temperature sensor 262 may not be located on the stability module 260. The temperature sensor 262 may be located on the motor housing $204^{II}$, on the fan case 233 and/or one of the support members 252 of the fan assembly $201^{III}$, on the motor control module $205^{III}$, on the connector 206, etc. The stability module 260 may not include control functionality, such as a control module.

Referring now to FIG. 3, a fan system $200^{V}$ incorporating a motor control module $205^{IV}$ is shown. The motor control module $205^{IV}$ may be used in the fan systems of FIGS. 2A-2E, 5 and 6. The motor control module $205^{IV}$ may be located in the connector 206, include a PCB or be an IC, and communicate with the host device control module 209 via the conductors 210. The motor control module $205^{IV}$ may include a power control module 272, a speed control module 273, and an inductive sensing system 274. The inductive sensing system 274 may include the speed control module 273, a back electromotive force (BEMF) detection module 275 and/or a current detection module 276. The power control module 272, BEMF detection module 275, and current detection module 276 may communicate with terminals 227 on the fan assembly 201 via an interface 277. The fan assembly 201 may be replaced with one of the other fan assemblies disclosed herein.

The power control module 272 may apply a voltage and/or current to one or more of the stator coils 224 of the fan assembly 201. For example, the power control module 272 may alternate between driving stator coils 224-1, 224-2 and 224-3, 224-4 to rotate the rotor 226.

While the inductive sensing system 274 is described using a two-phase brushless DC motor, the inductive sensing system 274 may also be implemented in other motor systems (e.g., one-phase or three-phase motor systems).

The BEMF detection module 275 may detect BEMF voltage from undriven ones of the stator coils 224. In a stator coil that is not powered, a BEMF voltage having a sinusoidal waveform is generated by permanent magnets (not shown) in the rotor 226. Specifically, as the permanent magnets of the rotor 226 pass by the unpowered coil (e.g. 224-4), a current is induced in the unpowered coil 224-4. In one implementation, the power control module 272 initially provides voltage and/or current to stator coils 224-1, 224-2 but not coil(s) 224-3 and/or 224-4. The BEMF detection module 275 detects BEMF from the coil 224-3 and/or the coil 224-4.

The speed control module 273 determines when the magnets of the rotor 226 pass by the coil 224-3 and/or the coil 224-4 based on signals from the BEMF detection module 275. The speed control module 273 may include data indicating distances between and/or positions of the stator poles 216.

In an alternative implementation, the current detection module 276 detects current at each of the stator coils 224-1, 224-2, 224-3, 224-4. The speed control module 273 determines positions of the stator poles 216 based on the detected current and the detected BEMF.

The speed control module 273 may determine the rotational speed of the rotor 226 and whether the rotor 226 is moving and/or stuck based on the waveform of the detected BEMF and the position of the stator poles 216. The speed control module 273 may generate control signals to adaptively adjust the rotation speed of the motor 203.

Figure 4:
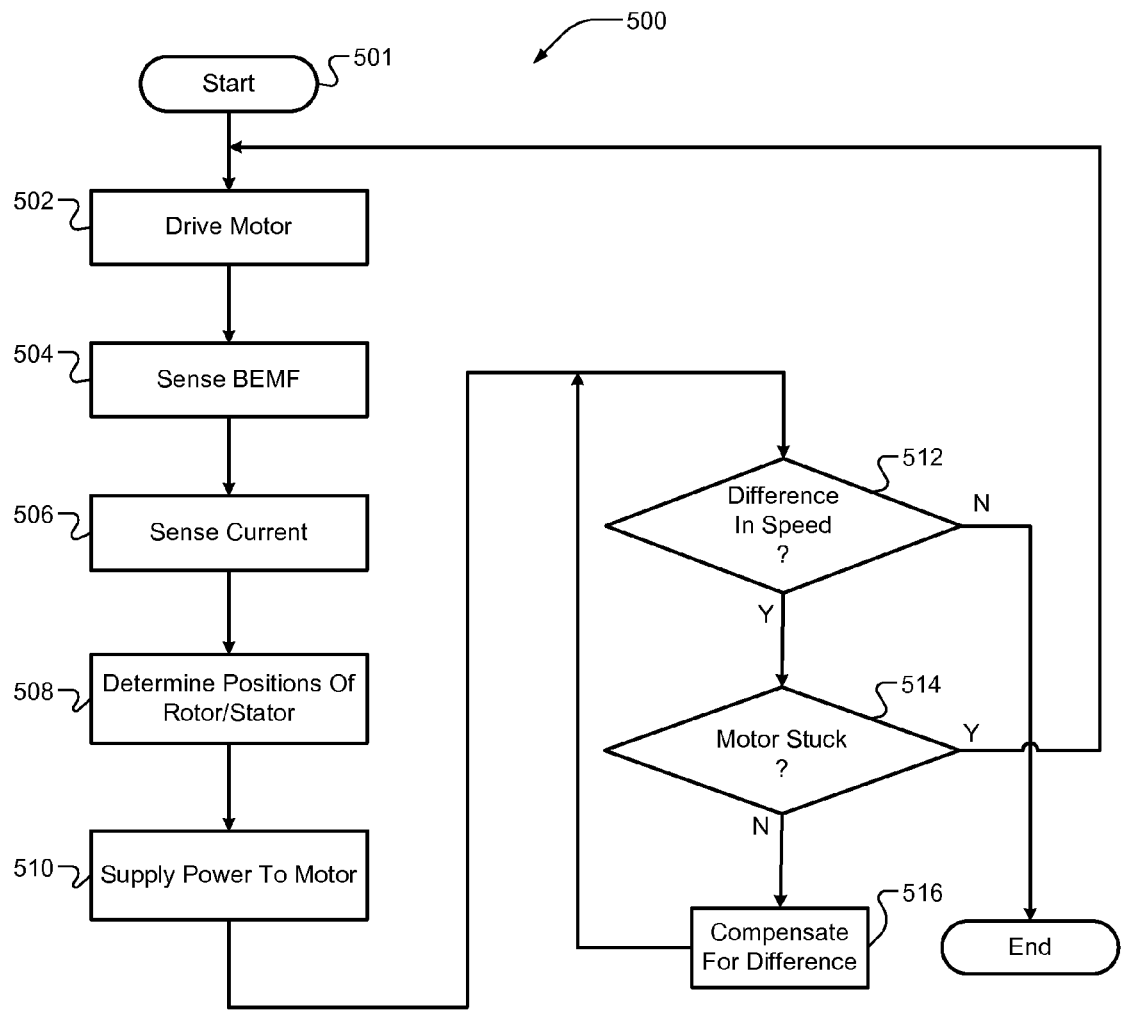
FIG. 4 illustrates a method of operating a fan system in accordance with the present disclosure.

The fan systems disclosed herein may be operated using numerous methods, an example method is provided by the method of FIG. 4. In FIG. 4, a method of operating a fan system is shown.

Although the following tasks are primarily described with respect to the implementations of FIGS. 2A-2E, 5 and 6, the tasks may be easily modified to apply to other implementations of the present disclosure. The tasks may be iteratively performed.

The method may begin at 501. At 502, the power control module 272 drives a motor (e.g., one of the motors 203-$203^{II}$). In one implementation, the power control module 272 rotates a rotor (e.g., the rotor 226 or the rotor 240) by supplying a drive current and/or a drive voltage to the stator coils of a stator (e.g., stator coils 224 of the stator 215). At 504, the BEMF detection module 275 detects the BEMF from the stator coils that are not supplied with the drive current or the drive voltage. At 506, the current detection module 276 senses current at terminals of the stator coils (e.g., the terminals 227).

At 508, the speed control module 273 determines the relative positions of the stator and the rotor based on the detected BEMF and/or the detected current. The speed control module 273 selects one of the stator coils according to the detected relative positions of the stator and the rotor.

At 510, the power control module 273 supplies the drive current or the drive voltage to the selected coil to rotate the rotor in a predetermined direction at a desired speed. At 512, the speed control module 273 may determine that the speed of the rotor is different than a desired (or predetermined) speed based on the BEMF and/or the current detected from motor. In one implementation, the speed control module 273 may determine a difference (i.e., an error) between the desired speed and the measured (or actual) speed. The speed control module 273 may receive the desired speed from, for example, the host device control module 209.

The host device control module 209 may command to start or stop the fan 214 and/or indicate a reference speed via a control signal (represented by signal line 280). The speed control module 273 may convert the reference speed to the desired speed based on, for example, the temperature signal from the temperature sensor 211, characteristics 278 of the fan assembly 201, etc. The characteristics of the of the fan assembly 201 may be stored in memory 229 of the motor control module $205^{IV}$ and include size of the fan blades 212, size, type, power output, etc. of the motor 203, and/or other fan assembly characteristics.

At 514, if there is a difference between the actual speed and the desired speed, the speed control module 273 may determine whether the motor is stuck. If the motor is stuck, task 502 may be performed, otherwise task 516 is performed. At 516, the speed control module 273 may provide a signal to the power control module 272 to adjust the power supplied to the motor. In other words, the speed control module 273 may generate a control signal to compensate for the difference. In one implementation, the speed control module 273 adaptively outputs successive control signals to the power control module 272 in order to adjust the speed of the motor to the desired value.

The above-described tasks are meant to be illustrative examples; the tasks may be performed sequentially, synchronously, simultaneously, continuously, during overlapping time periods or in a different order depending upon the application.

In FIG. 5, a fan system $200^{VI}$ incorporating a motor control module $205^{II}$ in a cable 288 is shown. The fan system $200^{VI}$ includes a fan assembly $201^{IV}$ and a control circuit $202^{IV}$. The fan assembly $201^{IV}$ includes a fan case $233^{I}$. The fan case $233^{I}$ includes three of the support members 252 and a channeled support member $252^{I}$. The support members 252 and $252^{I}$ support the fan $214^{I}$. The fan $214^{I}$ includes the motor housing $204^{II}$ and the fan blades $212^{I}$. The motor housing $204^{II}$ encases the motor $203^{II}$. The motor $203^{II}$ includes the stator 215 and a rotor (e.g., the rotor 226 or the rotor 240).

The channeled support member $252^{I}$ may be 'U'-shaped, open and/or include a channel 290 for conductors $225^{I}$ to extend from the motor housing $204^{II}$ to the peripheral wall 250 of the fan case 233. The conductors $225^{I}$ may be connected to a first connector 292 external to the fan case $233^{I}$.

The control circuit $202^{IV}$ includes a motor control module assembly 300 and the host device control module 209. The motor control module assembly 300 may include a motor control module $205^{II}$, a second connector 302 and/or a third connector 304. The motor control module $205^{II}$ may be connected to the second and third connectors 302 and 304 via respective sets of conductors 306, 308 (may be referred to as third and fourth sets of conductors). The second connector 302 connects to the first connector 292. The third connector 304 connects to a fourth connector 310. The fourth connector 310 is connected to the host device control module via conductors $210^{I}$. The motor control module assembly 300 may be connected in series or in parallel with the conductors $210^{I}$ and the conductors $225^{I}$ to form the cable 288. The cable 288 extends between the motor housing $204^{II}$ and the host device control module 209.

The motor control module $205^{II}$ may be integrated into the cable 288 without use of connectors. For example, the motor control module $205^{II}$ may be integrated into the cable 288 without use of the connectors 292, 302, 304, 310. Wires and/or conductors, such as the conductors 210, of the cable 288 may be connected, for example, directly to the motor control module $205^{II}$.

Width W of the motor control module $205^{II}$ may be less than or equal to 4 times a diameter D of each of the conductors $225^{I}$ (or W≤4D or W is less than or equal to an overall width of the conductors $225^{I}$). The motor control module $205^{II}$, the first set of conductors 306 and the second set of conductors 308 may be shrink wrapped to protect the motor control module $205^{II}$ and wire connections therewith.

As shown, the motor control module $205^{II}$ is connected along conductors between the motor housing $204^{II}$ and the host device control module 209. This allows the motor control module $205^{II}$ to be placed at various locations and be replaced without opening the motor housing $204^{II}$ and/or disassembling the fan assembly $200^{VII}$. Incorporation of the connectors 292, 302, 304, 310 allows the motor control module $205^{II}$ to be easily replaced without cutting, splicing, and/or soldering conductors. This provides a modular design and allows for testing of different motor control modules. For example, the motor control module $205^{II}$ may be replaced with a different motor control module (e.g., the motor control module 205 or other motor control module).

In FIG. 6, a fan system $200^{II}$ incorporating a motor control module $205^{II}$ in the support member $252^{I}$ is shown. The fan system $200^{II}$ includes a fan assembly $201^{V}$ and a control circuit $202^{V}$. The fan assembly $201^{V}$ includes the fan case $233^{I}$. The fan case $233^{I}$ includes three of the support members 252 and a channeled support member $252^{I}$. The support members 252 and $252^{I}$ support the fan $214^{I}$. The fan $214^{I}$ includes the motor housing $204^{II}$ and the fan blades $212^{I}$. The motor housing $204^{II}$ encases the motor $203^{II}$. The motor $203^{II}$ includes the stator 215 and a rotor (e.g., the rotor 226 or the rotor 240).

The channeled support member $252^{I}$ may be 'U'-shaped and/or include a channel 290 for conductors $225^{I}$ (first set of conductors) to extend from the motor housing $204^{II}$ to the motor control module $205^{II}$. Although the motor control module $205^{II}$ is shown as being incorporated in the support member $252^{II}$, the motor control module $205^{II}$ may be incorporated in other members of the fan case $233^{I}$. For example, the motor control module $205^{II}$ may be incorporated in the peripheral wall 250. The channel 290 may be open on one side to allow access to the motor control module $205^{II}$. Any side of the channel 290 may be open. Another set of conductors 320 may be connected to and extend from the motor control module 205$^{II}$ to a first connector 322 external to the fan case 233$^{I}$.

The control circuit 202$^{II}$ includes the motor control module 205$^{II}$ and the host device control module 209. The motor control module 205$^{II}$ is located in the channel 290 of the support member 252$^{I}$. The first connector 322 is connected to a second connector 324, which is connected to the host device control module 209 via the conductors 210.

Width W1 of the motor control module 205$^{II}$ may be less than or equal to 4 times a diameter D of each of the conductors 225$^{I}$ (or W≤4D) and/or less than an inner width W2 of the channel 290. The width dimensions of the motor control module disclosed herein do not refer to a thickness of a PCB and/or IC. The width dimensions may refer to, for example, front or top view surface dimensions. The motor control module 205$^{II}$ and the conductors 225$^{I}$, 320 may be shrink wrapped to protect the motor control module 205$^{II}$ and corresponding wire connections.

When the motor control module 205$^{II}$ includes a temperature sensor 211, the temperature sensor may protrude from the motor control module 205$^{II}$ and be in contact with air passing through the fan case 233$^{I}$. The temperature sensor 211 may protrude from the shrink wrap and/or extend from the channel 290. The support member 252$^{I}$ may include one or more openings 326 (one is shown) to allow air to pass through the support member 252$^{I}$ and come in contact with the temperature sensor 211.

The motor control module 205$^{II}$ may be connected in series with the conductors 225$^{I}$, the conductors 320, the connectors 322, 324 and the conductors 210$^{I}$ to form a cable 288$^{I}$. The cable 288$^{I}$ extends between the motor housing 204$^{II}$ and the host device control module 209.

As shown, the motor control module 205$^{II}$ is connected along conductors between the motor housing 204$^{II}$ and the host device control module 209 and in the center of the channel 290 between the motor housing 204$^{II}$ and the peripheral wall 250 of the fan case 233$^{I}$. This allows the motor control module 205$^{II}$ to be protected by the support member 252$^{I}$ and for the temperature sensor 211 to be placed in the middle of the air flow path that passes through the fan assembly 200$^{VII}$. The motor control module 205$^{II}$ may be placed anywhere along support member 252$^{I}$. Connectors may be incorporated between the motor control module 205$^{II}$ and the motor housing 204$^{II}$ to allow for easy replacement of the motor control module 205$^{II}$ and/or testing of multiple motor control modules without opening the motor housing 204$^{II}$.

Also, the implementations of FIGS. 5 and 6 allow for different fan assemblies and/or motor control modules to be tested. For example, in FIGS. 5 and 6 the fan assemblies 201$^{V}$ and 201$^{VI}$ may be swapped out with other fan assemblies by disconnecting the connectors 292, 322.

By having the motor control modules disclosed herein be outside of respective motor housings, air temperatures outside of the motor housings and/or corresponding hosts can be more accurately detected. As the temperature sensors are not located in the motor housings the temperature sensors are less susceptible to increased temperatures within the motor housings.

Also, by not incorporating a Hall effect sensor and/or a temperature sensor on a PCB, SIP and/or SOC of a motor control module, more flexibility is provided in design of a fan motor, motor housing, and fan case. Separation of a Hall effect sensor and/or a temperature sensor from a motor control module and/or the elimination of the Hall effect sensor minimizes the number of components in the motor control module. This allows for the motor control module to be incorporated in a cable, in a support member or other member of a fan assembly, and/or elsewhere in a host and external to a fan assembly. Removal of the temperature sensor from the motor housing can also reduce noise in the temperature signal.

In addition, by separating the motor control module from the motor housing of a fan assembly, design changes can quickly and easily be made to the motor control module. For example, the motor control module may be reprogrammed or replaced without opening and/or entering the motor housing.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An integrated circuit for controlling operation of a motor of a fan assembly, wherein the fan assembly comprises a housing and a fan, wherein the motor is in the housing, and wherein the motor is configured to rotate the fan, the integrated circuit comprising:
 a detection module separate from the fan assembly, wherein the detection module is configured to, without receiving a signal from a sensor, detect (i) a voltage induced in a first coil of the motor, wherein the first coil is an undriven coil; and
 a first control module configured to (i) receive a control signal from a second control module, and (ii) control the operation of the motor of the fan assembly to control a speed of the fan based on (a) the control signal, and (b) the voltage induced in the first coil of the motor, wherein the second control module is separate from the integrated circuit,
 wherein the first control module is further configured to determine the speed of the fan and positions of stator poles based on the voltage induced in the first coil of the motor,
  compare the speed of the fan to a predetermined speed,
  if the speed of the fan is not equal to the predetermined speed, proceed with determining whether the motor is stuck and the fan is not rotating,
  wherein the determining of whether the motor is stuck and the fan is not rotating is based on (i) a waveform of a back electromotive force received from the first coil of the motor, and (ii) the positions of stator poles, and
  if the motor is stuck and the fan is not rotating, refrain from adjusting the speed of the fan.

2. The integrated circuit of claim 1, wherein:
 the first control module is configured to (i) receive a signal from a sensor of the fan assembly, and (ii) based on the signal from the sensor, adjust the speed of the fan; and
 the fan assembly comprises the sensor.

3. The integrated circuit of claim 1, wherein the detection module is configured to, independent of signals transmitted from one or more sensors to the integrated circuit, detect (i) the voltage induced in the first coil of the motor, or (ii) the back electromotive force received from the first coil of the motor.

4. An integrated circuit for controlling operation of a motor of a fan assembly, wherein the fan assembly comprises a housing and a fan, wherein the motor is in the housing, wherein the housing is void of sensors, and wherein the motor is configured to rotate the fan, the integrated circuit comprising:
  a detection module separate from the fan assembly, wherein the detection module is configured to detect a voltage induced in a first coil of the motor, wherein the first coil is an undriven coil; and
  a first control module configured to (i) receive a control signal from a second control module, and (ii) control the operation of the motor of the fan assembly to control a speed of the fan based on (a) the control signal, and (b) the voltage induced in the first coil of the motor, wherein the second control module is separate from the integrated circuit,
  wherein the first control module is further configured to
    determine the speed of the fan and positions of stator poles based on the voltage induced in the first coil of the motor,
    compare the speed of the fan to a predetermined speed,
    if the speed of the fan is not equal to the predetermined speed, proceed with determining whether the motor is stuck and the fan is not rotating,
    wherein the determining of whether the motor is stuck and the fan is not rotating is based on (i) a waveform of a back electromotive force received from the first coil of the motor, and (ii) the positions of stator poles, and
    if the motor is stuck and the fan is not rotating, refrain from adjusting the speed of the fan.

5. The integrated circuit of claim 4, wherein:
  the detection module is connected to the fan assembly via a first set of conductors; and
  the first control module is connected to the second control module via a second set of conductors.

6. The integrated circuit of claim 4, further comprising a power module configured to supply power to a second coil to generate the voltage induced in the first coil of the motor.

7. The integrated circuit of claim 6, wherein the power module is configured to supply the power to the second coil while not supplying power to the first coil.

8. The integrated circuit of claim 6, wherein the detection module and the power module are both connected to the fan assembly via a plurality of wires and an interface.

9. The integrated circuit of claim 4, wherein the first control module is configured to, based on the voltage induced in the first coil of the motor or the back electromotive force received from the first coil of the motor, control (i) a speed of the fan, or (ii) a direction the fan is rotating.

10. The integrated circuit of claim 4, wherein:
  the first control module is configured to (i) detect a position of the fan based on the voltage induced in the first coil of the motor or the back electromotive force received from the first coil of the motor, and (ii) based on the position, adjust the speed of the fan from a first speed to a second speed; and
  the first speed and the second speed are greater than zero.

11. The integrated circuit of claim 4, wherein the first control module is configured to adjust the speed of the fan if (i) the fan is rotating, and (ii) the speed of the fan is not equal to the predetermined speed.

12. The integrated circuit of claim 4, wherein:
  the first control module receives the control signal from a host device,
  the host device comprises the second control module
  the control signal comprises the predetermined speed, and
  the host device is separate from the integrated circuit.

13. A computer comprising:
  the integrated circuit of claim 12;
  the host device; and
  the fan assembly.

14. The integrated circuit of claim 4, wherein the first control module is configured (i) drive a second coil of the motor while not driving the first coil, and (ii) determine whether the motor is stuck and the fan is not rotating based on the voltage induced in the first coil of the motor.

15. An integrated circuit for controlling operation of a motor of a fan assembly, wherein the fan assembly comprises a housing, one or more sensors, and a fan, wherein the motor is in the housing, and wherein the motor is configured to rotate the fan, the integrated circuit comprising:
  a detection module separate from the fan assembly, wherein the detection module is configured to, independent of signals generated by the one or more sensors, detect (i) a voltage induced in a first coil of the motor, wherein the first coil is an undriven coil; and
  a first control module configured to (i) receive a control signal from a second control module, and (ii) control the operation of the motor of the fan assembly to control a speed of the fan based on (a) the control signal, and (b) the voltage induced in the first coil of the motor, wherein the second control module is separate from the integrated circuit,
  wherein the first control module is further configured to
    determine the speed of the fan and positions of stator poles based on the voltage induced in the first coil of the motor,
    compare the speed of the fan to a predetermined speed,
    if the speed of the fan is not equal to the predetermined speed, proceed with determining whether the motor is stuck and the fan is not rotating,
    wherein the determining of whether the motor is stuck and the fan is not rotating is based on (i) a waveform of a back electromotive force received from the first coil of the motor, and (ii) the positions of stator poles, and
    if the motor is stuck and the fan is not rotating, refrain from adjusting the speed of the fan.

16. The integrated circuit of claim 15, wherein the first control module is configured to (i) receive the signals from the one or more sensors, and (ii) based on the signals, adjust the speed of the fan.

17. The integrated circuit of claim 15, further comprising a power module configured to (i) supply power to a second coil to generate the voltage induced in the first coil of the motor, and (ii) supply the power to the second coil while not supplying power to the first coil,
  wherein the detection module and the power module are both connected to the fan assembly via a plurality of wires and an interface.

18. The integrated circuit of claim 15, wherein the first control module is configured to, based on the voltage induced in the first coil of the motor or the back electromotive force received from the first coil of the motor, control (i) a speed of the fan, or (ii) a direction the fan is rotating.

19. The integrated circuit of claim 15, wherein:
  the first control module is configured to (i) detect a position of the fan based on the voltage induced in the first coil of the motor or the back electromotive force received from the first coil of the motor, and (ii) based on the position, adjust the speed of the fan from a first speed to a second speed; and
  the first speed and the second speed are greater than zero.

* * * * *